Figure 1:
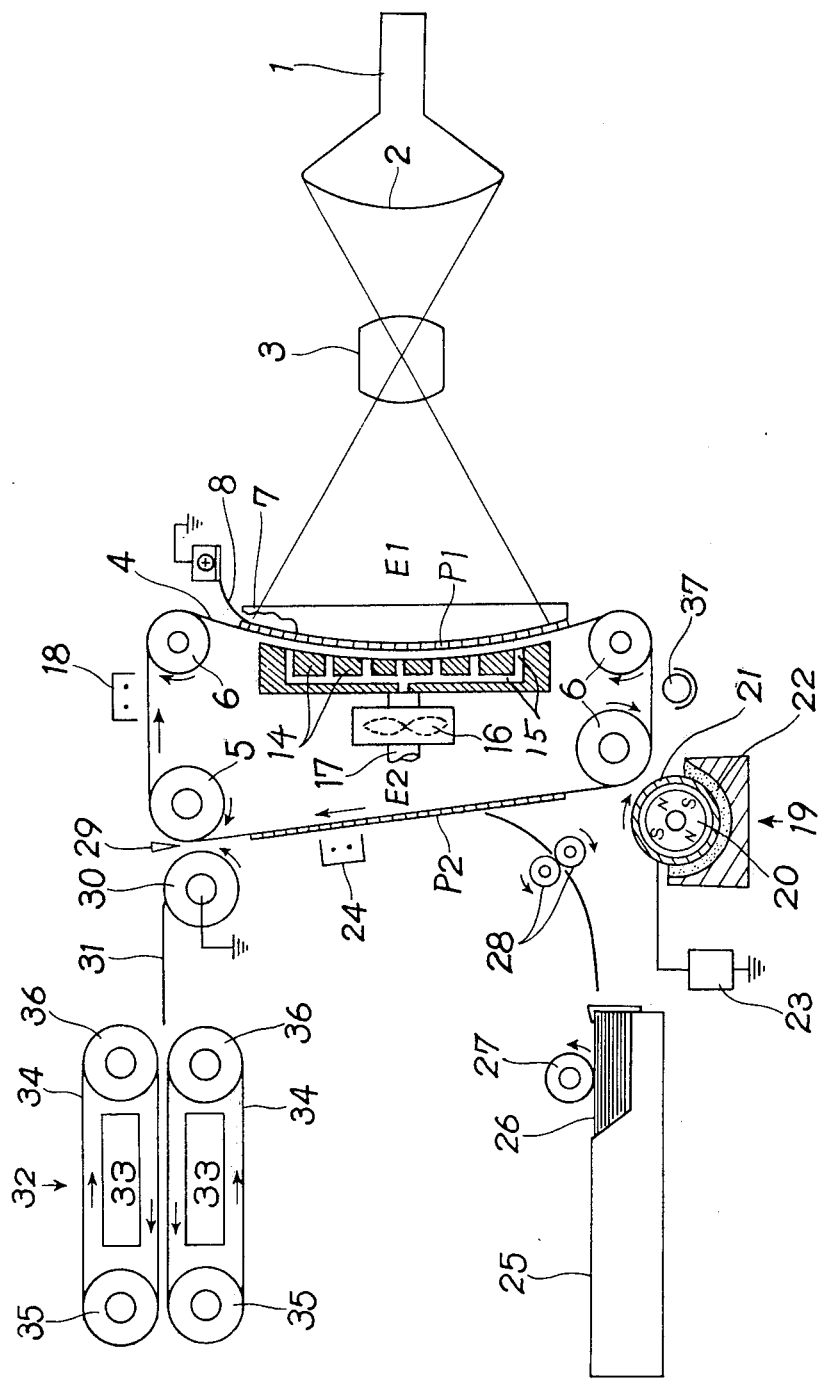

United States Patent [19]

Hashida et al.

[11] 4,003,651

[45] Jan. 18, 1977

[54] SYSTEM FOR RECORDING IMAGES RECEIVED BY FACSIMILE

[75] Inventors: Yoshisuke Hashida; Tsuneo Hibino, both of Hachioji, Japan

[73] Assignee: Konishiroku Photo Industry Co., Ltd., Tokyo, Japan

[22] Filed: Jan. 24, 1975

[21] Appl. No.: 543,903

[30] Foreign Application Priority Data

Jan. 28, 1974 Japan .............. 49-11964
Jan. 28, 1974 Japan .............. 49-12107[U]

[52] U.S. Cl. .................. 355/16; 355/3 R; 355/15
[51] Int. Cl.² ................... G03G 15/00
[58] Field of Search ............ 355/3 R, 1, 15, 16, 355/3 BE, 3 DR, 20; 352/228

[56] References Cited

UNITED STATES PATENTS

| | | | |
|---|---|---|---|
| 3,301,128 | 1/1967 | Brandt et al. ............ | 352/228 X |
| 3,700,328 | 10/1972 | Davidge ............... | 355/15 |
| 3,796,488 | 3/1974 | Tanaka ............... | 355/16 |
| 3,826,570 | 7/1974 | Kolibas ............... | 355/3 DR |
| 3,834,803 | 9/1974 | Tsukada ............... | 355/1 |
| 3,860,340 | 1/1975 | Jordan ............... | 355/16 |

Primary Examiner—Richard L. Moses

[57] ABSTRACT

A system of image formation in combination with a facsimile recording system in which a latent image is formed on a photosensitive plate through an optical projection device by light spots. The surface of a flying spot scanner tube is scanned sequentially and then the image is changed into a toner image. A projection surface of the optical projecting device is positioned along the movement path of a photosensitive plate retaining member having two photosensitive plates at the symmetrical positions on the member, and these two photosensitive plates are moved to pass the projection station and the transfer station alternately. In addition to the optical projection device, at least a charging device, a developing device and a transferring device are disposed along the moving path of the photosensitive plates and a d.c. biasing voltge is applied to the developing device so as to avoid any stain on the photosensitive plates at the time of development, and to remove residual toner on the photosensitive plates at the time of cleaning. The functions of both development and cleaning are realized by a single means.

4 Claims, 4 Drawing Figures

SYSTEM FOR RECORDING IMAGES RECEIVED BY FACSIMILE

The present invention relates in general to a facsmile telegraphy and in particular to a system of recording an image at a receiving and recording station of the facsimile communication, and the improvement thereof.

As is well known, the facsimile telegraphy is a kind of telecommunications in which image information such as photographs and characters is electrically transmitted and received at remote locations to reproduce the original information. In more particular, the original image to be transmitted is dissolved into a plurality of pictorial elements by a scanning method, which elements are then subjected to a photoelectric transformation thereby to produce electric signals in correspondence with densities (or gray tones) of the dissolved elements. The thus obtained electric signals are subsequently amplified, modulated, filtered and so forth and transmitted to a receiving station at which the received signals are amplified, demodulated and converted electro-photometrically to obtain the same image as the original one.

As a recording method at the receiving station, a so-called discharge-destruction method is known according to which a recording sheet material or paper made electrically conductive by graphite and applied with a semiconductor material such as titanium oxide or zinc stearate is disposed in contact with needle electrodes which are adapted to produce a spark discharge in accordance with the obtained signals for removing the semiconductor material at the corresonding positions of the recording sheet to thereby make the recording. This destructive recording method has certainly an advantage that it can be carried out with a relatively simplified mechanism and is suited for the recording of the information such as characters or the like. However, the method is disadvantageous in that it can not conveniently be employed to the reproducing of an image having half-tone such as photographs. Further, this recording method has a drawback that a stink is given out during the recording.

As aother recording method, it is also known to employ a recording sheet or paper impregnated with an electrolyte which is destined to undergo an electrolysis in dependence upon the received electrical signals to produce a colored image through ionic reactions. This method is referred to as an electrolysis recording method and suited for a high speed recording. However, the method is disadvantageous in that inconveniences will arise in the handling of the recording paper after the development treatment due to the wetted state thereof.

Further, a recording method referred to as an electromagnetic printing method is known according to which two sheets of superposed carbon and white papers are pressed by electromagnetic and mechanical means actuated in dependence upon the received signal. Although the printing method provides an advantage that a number of copies may be simultaneously produced, as occasions require, and that an inexpensive paper material is sufficient for the recording, it is disadvantageous that resolution is relatively low and that the method can not be applied to high speed recording.

Furthermore, an electrostatic recording method is known which is based on the principle of electrostatic copying technique. This method allows a good reproduction of half tones and besides a convenient handling due to the drying type nature thereof. Additionally, the resolution is excellent as compared with other known methods. For these reasons, the electrostatic recording method has lately attracted a noticeable attention in the art. For carrying out this method, a flying spot scanner tube having a substantially spherically curved screen surface is generally used. The photosensitive recording material particularly in a flat sheet-like form is disposed movably in opposition to the screen surface. In this connection, it is required that the photosensitive sheet material be positioned along a curved path so as to conform to the curvature of the screen surface in order to obtain a image of high quality. Such requirement can not however be fulfilled in the apparatus in which a single photosensitive material in a form of an endless sheet or a plurality of photosensitive sheets attached to an endless carrier band with appropriate space therebetween are successively passed by the screen surface of the flying spot scanner tube in a circurated fashion, since the photosensitive material is supported by respective rolls under tension in such a manner that the exposed surface of the photosensitive material faces toward the curved screen surface in a linear plane. Accordingly, with the apparatus as described above with which the present invention concerns, a printed image of a good quality can not be produced because of unsatisfactory projection of focusing of the irradiant image.

Accordingly, it is an object of the present invention is to provide an image recording system for use in combination with a facsimile which is operative on the principle of the electrostatic recording technic and allows a high quality of a recorded image with a good efficiency, in which system the bright spot on the fluorescent plate of the flying spot scanner tube are projected onto the photosensitive sheet material through a correspondingly arranged optical projection system.

To accomplish the above object, there is provided according to the invention a system wherein two sheets of photosensitive materials are disposed at fixed positions on a carrying member which can be moved in an endless belt along a path which is partially constituted by a projection plane onto which a series of bright spots are projected from the fluorescent face of the scanner tube through an optical system. The endless movement of the carrier member is so controlled that when either one of the photosensitive sheets is located at the projection position, the other may be located at the position different from said projection position, and the latter may be positioned at said projection plane after another one and a half times of revolving movement of the endless carrier member. In addition to the optical system for the projection, at least a charging means, a developing means and a transfer means are disposed along the moving path of the photosensitive sheets. The developing means is of the type disclosed U.S. Pat. No. 3647293, which is operative both to prevent fogging at the time of the development and to clear off the remaining toner particles on the photosensitive sheets at the time of cleaning the latter. This can be accomplished, for example, by applying a biasing voltage to the developing means, thus making a single means, that is, a developing means operative for both development and cleaning of the photosensitive plates. With three times of revolving movement of the carrier member, two sheets of copies can thus be produced.

Another object of the present invention is to improve an arrangement for holding the photosensitive plates at the projection position or at the projection position under the suction so as to attain a facsmile recording of an image of a high quality in the image recording system based on the principle of, the electrostatic recording technique.

The invention contemplates to eliminate the disadvantages mentioned hereinbefore. According to the invention, guide means contoured in correspondence with the vertical curvature of the display face of the scanner tube are provided at the projection station. In a prefered embodiment, the guide means comprise members positioned at the lateral sides which serve to guide the photosensitive sheets along the lateral edges and the other guide member positioned at the rear side which is formed with a curved surface conforming to the curvature of the display surface and additionally provided with a suction means to attract fittingly the photosensitive sheet to the curved guide surface. When the photosensitive plate is to be moved, the suction is interrupted to allow the movement of the sheet. When the image on the display place of the flying spot scanner tube is projected to the photosensitive sheet, the latter is held stationally in an appropriate position under suction, whereby a printed image of good quality can be obtained.

The above and other objects, novel features as well as advantages of the invention will become more apparent from the examination of the following description of preferred embodiments of the invention. The description makes reference to the drawings.

Figure 2:
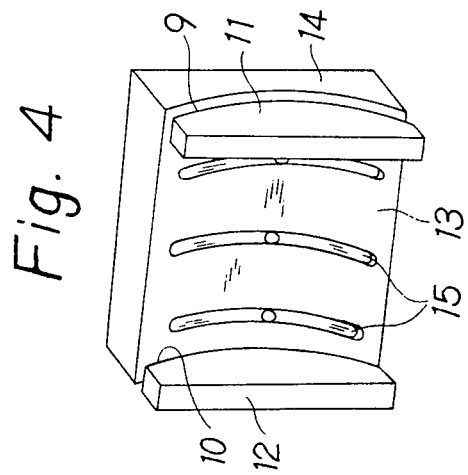
Figure 3:
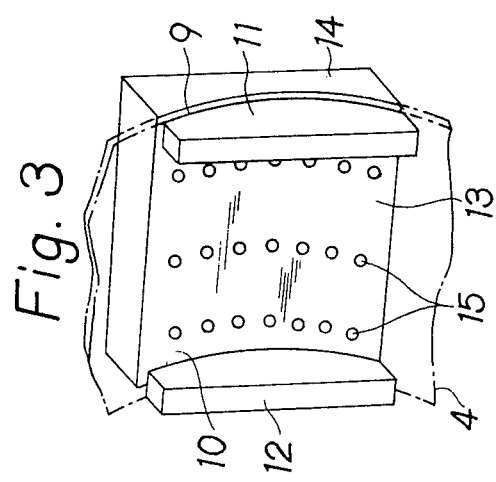
Figure 4:
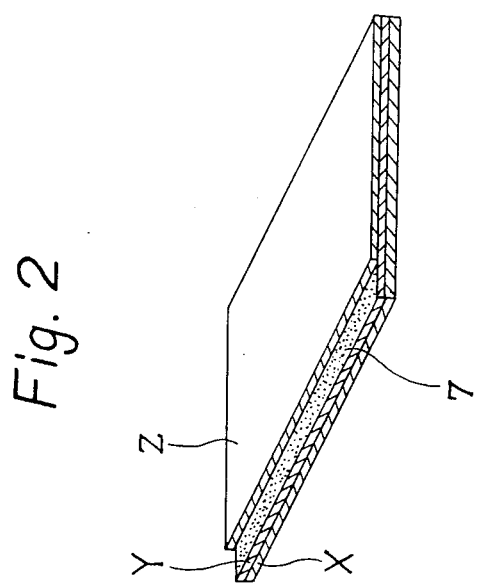

FIG. 1 schematically shows a general arrangement of a facsimile recording system according to the invention, FIG. 2 is a fragmental perspective view showing a structure and configuration of a photosensitive sheet, FIG. 3 shows guide members for holding the photosensitive sheet under a suction force according to the invention in a perspective view, and FIG. 4 is a similar view to FIG. 3 and shows a modification of the same members.

Now, the invention will be described with reference to an exemplary embodiment shown in the drawings and destined to produce a positive image from a negative image.

Referring to FIG. 1 which shows schematically an arrangement of a recording system according to the invention, reference numeral 1 denotes a scanning tube of a flying spot type having a semi-spherical fluorescent face 2 on which a series of scanning bright spots are produced. The scanning spots are projected onto a photosensitive sheet P1 disposed on an endless carrier belt 4, through an optical system 3 positioned in opposition to the fluorescent face 2. The endless carrier belt 4 is spanned around a drive roller 5 and guide rollers 6 supported on a machine frame (not shown) and is moved by a driving source (also not shown) in the direction indicated by arrows. Provided along the path of the endless belt 4 are a pair of stations E1 and E2 which are positioned in opposition to each other, and the station E1 is referred to as a projection station. In the state shown in FIG. 1, the photosensitive sheet P1 is positioned on the endless belt 4 at the projection station E1, while the photosensitive sheet P2 is located at the station E2. It is to be noted that the endless belt 4 is moved cyclically or intermittently in the sequence of a half-revolution followed by a one complete revolution.

As will be described in more detail hereinafter, the photosensitive sheet (P2 is the drawing) is electrically charged during the initial half-revolution of the belt 4 and, after the exposure to the projected bright points on the fluorescent plate 2 at the projection station E1, subjected to development, transfer and separation from the belt 4 during the succeeding complete revolution. During the next succeeding half-revolution, the removal of electric charge on and cleaning of one of the photosensitive sheets P2 are performed, while at the same time the other photosensitive sheet P1 is electrically charged and subsequently impressed with the bright spot beam in the stationary state at the projection station E1. In this manner, two sheets of photosensitive materials P1 and P2 can be simultaneously treated which result in enhancement of operating efficiency.

As is shown in FIG. 2, each of the photosensitive sheets P1 and P2 may be composed of a substrate X provided with an electrically conductive layer Y thereon on which in turn is coated a photo-conductive insulating material Z comprising a resin binder and zinc oxide particles dispersed in the binder with an exposed portion 7 of the electrically conductive layer Y being formed by removing the photosensitive insulation layer partially at a side thereof. The exposed portion 7 serves to ground electric charges passing through the photosensitive layer 7 at the illuminated portions thereof upon the projection of the light spots from the scanner tube 1. For this purpose, the exposed portion 7 is in contact with a metallic piece 8 having a certain degree of resiliency.

In order to hold the photosensitive sheet P1 or P2 substantially in the same semi-spherical configuration as that of the fluorescent face 2 of the flying spot scanner tube 1 at the location E1, there are provided a pair of guide members 11 and 12 which have convexly curved surfaces 9 and 10, respectively, and fixedly mounted at the station E1 along the path of the photosensitive sheets P1 and P2 with a space interposed between the guide members which substantially corresponds to the width of the photosensitive sheet. Additionally, another guide member 14 having a concavely curved surface 13 is fixedly disposed at a position opposite to the convex surfaces 9 and 10 of the guide members 11 and 12 with gaps formed between the surfaces 13 and 9 and 10 to allow the passage therethrough of the photosensitive sheet. The concave surface 13 of the guide member 14 is formed with a plurality of suction holes 15 which are communicated with an exhaust or suction conduit 17 accommodating therein a suction blower 16 (see FIG. 1).

Referring again to FIG. 1, reference numeral 18 indicates a charging and charge removing electrode of a corona discharge type of a negative potential which serves in respect to one of the photosensitive sheets to charge it upon the initial appearance thereof at the electrode 18 and at the same time to remove the electric charge from the same photosensitive sheet upon the second appearance thereof in the vicinity of the electrode so that the toner particles remaining on the photosensitive sheet may easily be cleared off by a succeeding cleaning means.

Numeral 19 denotes a developing apparatus of a so-called magnetic brush type composed of essentially fixed permanent magnets 20 with magnetic poles of different poles alternatively arrayed and a non-magnetic sleeve (hereinafter simply referred to as the sleeve) which is disposed rotatably around the permanent magnets 20 in the direction indicated by an arrow. In this connection, it can be easily understood that the sleeve 21 may be mounted stationarily with respect to the permanent magnets 20. Further, the permanent magnets 20 and the sleeve 21 may be mounted rotatably relative to each other.

Numeral 22 represents a developing agent containing carriers adapted to be charged negatively by frictional electrification. The developing apparatus 19 may be electrically connected to a suitable d.c. voltage source 23 so that the apparatus 19 can serve for the cleaning function in addition to the inherent developing function. This can be accomplished by applying the bias voltage of negative polarity to the sleeve 21 to develope the incoming photosensitive sheet P1 (orP2) which has undergone the exposure at the projection station E1, while the sleeve 21 is applied with the bias voltage of positive polarity, when the same photosensitive sheet P1 (or P2) reaches the developing apparatus at the second time, so that the latter then serves for the cleaning operation. Reference numeral 24 designates a transfer electrode of positive potential for a corona discharge for image transfer, 25 is an interchangeable cassette accommodating a volume of papers, 26 is a paper to be transfered with the image forming toner and 27 represents a dispensing roll which is coupled to a suitable driving means in such a manner that the roll 27 may dispense the paper 25 in synchronization with the copying operation. The paper 26 thus fed out is transiently held stationarily by means of feeding rolls 28. Numeral 29 denotes a pivotedly mounted scraper which may be composed of a thin film of polyester, for example, in an arcuate form so as to cause the paper 26 to be scraped from the photosensitive sheet P1 (or P2) without damaging the latter. The scraped paper 26 is then attracted by a separating and transporting roll 30 (called hereinafter simply the transporting roll) under the electrostatic force exerted by the transfer paper 26. The roll 30 is grounded to earth.

Numeral 31 indicates a guide, 32 a fixing apparatus having heating elements 33 such as electrically heated nichrome wires, and 34 transporting belts for transferring paper spanned around pairs of rolls 35 and 36, respectively and adapted to be driven in the direction indicated by arrows. Finally, the numeral 37 represents a lamp disposed at a position preceeding the developing apparatus 19 for the purpose of erasing the electric charge of the photosensitive sheet material P1 (or P2).

In operation, the photosensitive sheet P1 electrically charged by the charging electrode 18 during a half-revolution of the endless belt 4 is stopped at the projection station E1 and made closely contacted with the concave surface of the guide member 14 under the suction of the now actuated blower 16 through the suction holes 15 formed in the guide member 14, the sheet material being also made arcuately through the guide members 11 and 12. In this way, the exposed surface of the photosensitive sheet P1 is made in a semi-spherical form substantially corresponding to that of the fluorescent face 2 of the scanning tube 1, whereupon the light spots appearing on the fluorescent face 2 of the tube 1 produced from the received signal emitted by the transmitter station can be successively projected to the photosensitive sheet P1 through the optical system 3 thereby to produce a negative latent image thereon.

In the conventional electrophotography, electric charge is usually cleared off from the photosensitive sheet at the portions illuminated by light so that no toner particles will adhere thereto, while non-illuminated portions of the photosensitive sheet corresponding to characters or the like will carry the electric charge so that the toner particles can adhere to these portions. Accordingly, the electrostatic latent image as well as the image on the transfer paper will both be positive. To the contrary, in case of the system according to the invention, the characters or the like appeared on the fluorescent face of the scanner tube 1 are reproduced in negative type. In this method, the charging polarities of the photosensitive sheet and the toner are selected identical with each other, so that the toner particles can adhere to the portions of the sheet exposed to light from the fluorescent face 2. The non-exposed portions of the photosensitive sheet maintain the electric charge as it is. The toner particle will not adhere to the unexposed portions under the electrostatic repulsing force between the unexposed portion and the toner particles due to their identical polarity. The toner adheres to only the portion illuminated by the spots of the scanner tube. Such development is carried out by the apparatus 19 upon the revolution of the photosensitive sheet material subsequent to the exposure station, so that negative toner images with respect to the image on the scanner tube are obtained. Then the photosensitive sheet material superposed with the paper 26 to which the toner image is to be transferred passes through the corona discharger 24. Next, the paper 26 attracted electrostatically to the photosensitive sheet P1 is delaminated from the latter by means of the scraper 29 and thereafter transported into the fixing apparatus 32 through the transporting rolls 30, whereby a copy having a fused and set toner image can be produced. On the other hand, the photosensitive sheet P1 continues to be moved with the residual toner particles carried after the transfer of the image. Now, the charging and charge removing electrode 18 is made active to change over the electrostatically adhering state of the toner particles into a state of mechanical adherence. After the erasion of the electrical potential of the photosensitive sheet P1 by means of the charge removing lamp 37, the material P1 is supplied to the developing apparatus 19 which functions then as a cleaner to clear off the residual toner particles by frictionally contacting the sheet P1 with the developer 22. The photosensitive sheet has now become ready for a renewal use. The other photosensitive sheet P2 undergoes the same process as the sheet P1 with a delay corresponding to one and a half revolutions. In this manner, during three revolution or circulated movement of the endless belt 4, two copies can be produced.

As will be appreciated from the foregoing description, the system according to the invention can be constructed in a small size and unneccessary consumption of the toner can be evaded, since the cleaning apparatus required in the hitherto known system can be omitted and a single electrode is used both for the purpose of charging and the removal of the charge. Besides, two sheets of the photosensitive material can be effectively utilized. Further, because projection of images is effected to the photosensitive sheet remaining stationarily, clear image of a good contrast can be produced.

The scanning tube of the flying spot type may have a semi-spherical configuration as well as flat one in place of the flat fluorescent face as discussed above.

The polarity of the voltages applied to the developing apparatus as well as other electrodes can be selectively determined in consideration of the images to be produced and the types of the photosensitive material to be used.

Additionally, the suction holes 15 may be formed in elongated slits as shown in FIG. 3. It is of course possible to modify the configuration and array of these suction openings in the sense to improve the suction power to the photosensitive sheet. The exhausting blower 16 need not be separately provided, but a vapor exhausting blower usually present in the copying machine can be utilized for the same purpose by providing a switching valve.

In summary, according to the present invention, a guide means is provided for the photosensitive sheet to position the latter so that the exposed surface thereof may take a curved form substantially identically with that of the bulging face 2 of the scanner tube 1 in cooperation with the action of the suction means provided at the rear side of the guide means. With such arrangement of the apparatus, the focusing of image on the fluorescent face 2 of the scanner tube 1 to the photosensitive sheet is improved to allow an accurate printing of the image thereon.

What we claim is:

1. An image recording system for use in combination with a facsimile in which a series of light spots scanning in sequence on the screen surface of a flying-spot scanner tube are projected onto a photosensitive sheet through an optical system to produce a latent image composed of said series of light spots on said photosensitive sheet and said latent image is visualized by use of toner, said system comprising: a carrying member movable along a fixed path containing a projection station of said optical system, two photosensitive sheets mounted on said carrying member is such a manner that one of said photosensitive sheet is positioned at said projection station while the other of said photosensitive sheet is position at another fixed position, means for mounting said two photosensitive sheets on said carrying member so that upon one and a half times of revolving movement of said carrying member, said one photosensitive sheet is positioned at said another fixed position while the other photosensitive sheet is positioned at said projection position, a developing means, a transfer means and an electrically charging means arranged along the movement path of said carrying member, and a fixing means, said developing means selectively functioning to develop the photosensitive sheet subjected to projection of said light spots and to remove the residual toners on the photosensitive sheet by application of electrical potential of desired polarity and of desired magnitude, and means for producing two copies of the recorded image for every three times of revolving movement of said carrying member.

2. An image recording system for use in combination with a facsimile in which a series of light spots scanning in sequence on the screen surface of a flying-spot scanner tube are projected onto a photosensitive sheet through an optical system to produce a latent image composed of said series of light spots on said photosensitive sheet and said latent image is visualized by use of toner, said system comprising:

a carrying member movable along a fixed path containing a projection station of said optical system,
two photosensitive sheets mounted on said carrying member in such a manner that one of said photosensitive sheet is positioned at said projection station while the other of said photosensitive sheet is positioned at another fixed position and that, upon one and a half times of revolving movement of said carrying member, said one photosensitive sheet is positioned at said another fixed position while the other photosensitive sheet is positioned at said projection position,
a developing means, a transfer means and an electrically charging means arranged along the movement path of said carrying member, and
a fixing means,
said developing means selectively functioning to develop the photosensitive sheet subjected to projection of said light spots and to remove the residual toners on the photosensitive sheet by application of electrical potential of desired polarity and of desired magnitude,
whereby two copies of the recorded image can be produced for every three times of revolving movement of said carrying member,
said photosensitive sheet being brought into close contact with a guide member at the projection position, said member having a concave guide surface substantially corresponding to the shape of the screen surface of the flying-spot scanner tube and being provided at the guide surface with a plurality of suction holes communicating with suction means to ensure suction of said photosensitive sheet onto said guide surface.

3. An image recording system as set forth in claim 2 wherein the photosensitive sheet is supported at the lateral edges thereof by a pair of guide members at the projection position each of which members has a convex guide surface conforming to said concave guide surface of said guide member and the photosensitive sheet being interposed between said guide member and said pair of guide members.

4. An image recording system for use in combination with a facsmile in which a series of light spots scanning in sequence on the screen surface of a flying-spot scanner tube are projected onto a photosensitive sheet through an optical system to produce a latent composed of said series of light spots on said photosensitive sheet and said latent image is visualized by use of toner, said system comprising:

a carrying member movable along a fixed path containing a projection station of said optical system,
two photosensitive sheets mounted on said carrying member in such a manner that one of said photosensitive sheet is positioned at said projection station while the other of said photosensitive sheet is positioned at another fixed position and that, upon one and a half times of revolving movement of said carrying member, said one photosensitive sheet is positioned at said another fixed position while the other photosensitive sheet is positioned at said projection position,
a developing means, a transfer means and an electrically charging means arranged along the movement path of said carrying member, and
a fixing means,
said developing means selectively functioning to develop the photosensitive sheet subjected to projection of said light spots and to remove the residual toners on the photosensitive sheet by application of electrical potential of desired polarity and of desired magnitude, whereby two copies of the recorded image can be produced for every three times of revolving movement of said carrying member, said photosensitive sheet being supported at the lateral edges thereof by a pair of guide members at the projection position, each of said members having convex guide surface substantially corresponding to the shape of the screen surface of the flying-spot scanner tube.

* * * * *

UNITED STATES PATENT AND TRADEMARK OFFICE

Certificate

Patent No. 4,003,651                  Patented January 18, 1977

Yoshisuke Hashida and Tsuneo Hibino

Application having been made by Yoshisuke Hashida and Tsuneo Hibino, the inventors named in the patent above identified, and Konishiroku Photo Industry Co., Ltd., the assignee, for the issuance of a certificate under the provisions of Title 35, Section 256, of the United States Code, adding the names of Lawrence L. Dobrin and John S. Campbell as joint inventors, and a showing and proof of facts satisfying the requirements of the said section having been submitted, it is this 4th day of November 1980, certified that the names of the said Lawrence L. Dobrin and John S. Campbell are hereby added to the said patent as joint inventors with the said Yoshisuke Hashida and Tsuneo Hibino.

FRED W. SHERLING,
*Associate Solicitor.*